United States Patent [19]

Minoura et al.

[11] 4,253,724
[45] Mar. 3, 1981

[54] RECORDING OPTICAL SYSTEM

[75] Inventors: Kazuo Minoura; Takashi Kitamura, both of Yokohama, Japan

[73] Assignee: Canon Kabushiki Kaisha, Tokyo, Japan

[21] Appl. No.: 31,944

[22] Filed: Apr. 20, 1979

[30] Foreign Application Priority Data

Apr. 28, 1978 [JP] Japan .................. 53-51848

[51] Int. Cl.³ .............................................. G02B 27/17
[52] U.S. Cl. ....................... 350/6.8; 358/130; 358/199; 331/94.5 H; 350/443; 350/433; 350/469; 350/475
[58] Field of Search ............... 350/6.8, 6.9, 8; 331/94.5 H; 358/199, 130

[56] References Cited

U.S. PATENT DOCUMENTS

| 2,844,648 | 7/1958 | Rosenthal | 350/6.8 |
| 3,469,030 | 9/1969 | Priebe | 350/6.8 |
| 3,835,249 | 9/1974 | Datillo et al. | 350/6.8 |
| 4,084,881 | 4/1978 | Herabazashi et al. | 350/6.8 |
| 4,142,160 | 2/1979 | Tsukada et al. | 331/94.5 A |

FOREIGN PATENT DOCUMENTS

| 2705412 | 8/1977 | Fed. Rep. of Germany | 350/6.8 |
| 7415489 | 4/1975 | Netherlands | 350/6.8 |

*Primary Examiner*—John K. Corbin
*Assistant Examiner*—B. W. de los Reyes
*Attorney, Agent, or Firm*—Fitzpatrick, Cella, Harper & Scinto

[57] ABSTRACT

A recording optical system comprising a semi-conductor laser of substantially single mode as the light source, an objective lens of which the focal point is located substantially at the beam divergent position of said semi-conductor laser in a plane perpendicular to the junction plane thereof, an afocal cylindrical lens composed of an element having a refractive power only in a plane parallel to said junction plane, an imaging lens, an aperture limiting the beam entering said imaging lens, and a photosensitive medium positioned in the vicinity of the focal point of said imaging lens.

10 Claims, 24 Drawing Figures

RECORDING OPTICAL SYSTEM

BACKGROUND OF THE INVENTION

1. Field of the Invention

The present invention relates to a recording optical system utilizing a semi-conductor laser as the light source.

2. Description of the Prior Art

Conventionally such optical system is known, for example as a scanning system, to be composed, as shown in FIG. 1, of a laser light source 1 such as a He-Ne laser or an Ar laser, a modulator 2 for modulating the beam from said laser, a deflector 3 such as a rotating polygonal mirror for deflecting thus modulated beam, a scanning lens 4, and a photosensitive medium 5. Such conventional optical system is disadvantageous in that not only the laser but also the modulator is expensive. Also the space of the laser and the modulator in the entire system is not negligible as the laser itself is of a considerably large size and the modulator requires a space of 200-300 mm in the optical path. In contrast to such conventional system, the use of a directly modulatable semi-conductor laser allows one to obtain an inexpensive compact system.

Although the optical system utilizing a semi-conductor laser as the light source was already disclosed for example in RCA Review Vol. 35, September 1974, p. 335–340 and in RCA Review Vol. 36, December 1975, p. 744–758, the laser utilized in these references shows significant variation in the operating mode in response to current variation, which leads to a considerable change of the size of focused spot. Such multi-mode light source is unable to provide a satisfactory image quality in the recording system.

Also in general the semi-conductor laser shows an astigmatism in that the beam waist position in a plane parallel to the junction plane thereof is different from that in a plane perpendicular to said junction plane. For this it is generally difficult to obtain a beam spot of a desired diameter and with a sufficient light intensity on a photosensitive medium, and this fact leads to a limitation in the image resolution.

Though such astigmatism is certainly correctable, the optical system required therefor requires cumbersome adjustment which is not desirable for industrial production.

SUMMARY OF THE INVENTION

The object of the present invention is to provide a recording optical system capable of providing a satisfactory image quality by a semi-conductor laser as the light source.

Another object of the present invention is to provide a recording optical system capable of providing a sufficient image resolution without complete correction of the above-mentioned astigmatism of the semi-conductor laser.

Still another object of the present invention is to provide a recording optical system capable of providing the photosensitive medium with a light intensity necessary for recording and still minimizing the beam spot diameter on said photosensitive medium.

The above-mentioned objects are achieved in the recording optical system of the present invention by focusing the beam divergent in a direction parallel to the junction plane of said semi-conductor laser and that in a direction perpendicular to said junction plane with an optical system having different image magnifications respectively in said two directions in such a manner that the focused points of the light beams in said mutually orthogonal directions are distanced within a diffraction limit, and by placing the recording plane at an arbitrary position between the focused positions in said two directions. More specifically in the recording optical system of the present invention there is provided, between the semi-conductor laser and the recording plane, an imaging optical system including an anamorphic optical system in order to maintain the distance between the focused position of the beam divergent in a direction parallel to the junction plane of the semi-conductor laser and that of the beam divergent in a direction perpendicular to said junction plane substantially within the diffraction limit, while securing a desirable light intensity on the recording plane.

In the recording optical system of the present invention there is employed a semi-conductor laser which can be handled as a so-called coherent light source capable of constantly maintaining a single oscillating mode despite any external perturbations such as current fluctuation.

DESCRIPTION OF THE PREFERRED EMBODIMENTS

Figure 1:
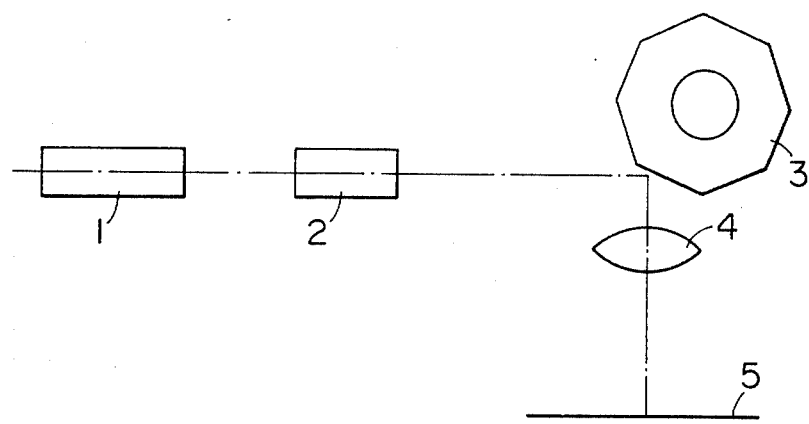
FIG. 1 is a view of a conventional scanning system.
Figure 2:
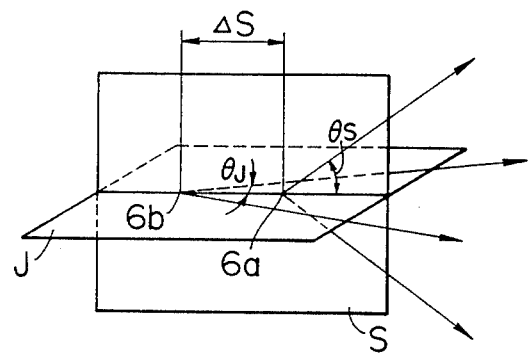
FIG. 2 is a schematic view showing the beams divergent from a semi-conductor laser.

FIG. 2 schematically shows the state of emission of laser beam from a semi-conductor laser to be employed in the present invention, wherein $6a$ is the beam divergent point in a plane S perpendicular to the junction plane of said laser while $6b$ is the beam divergent point in a plane J parallel to said junction plane.

It is already known that such semi-conductor laser is directly modulatable and is advantageous in achieving high-speed recording when applied in a scanning system. Therefore the present invention will hereinafter be explained in the application thereof in a scanning system.

Figure 3:
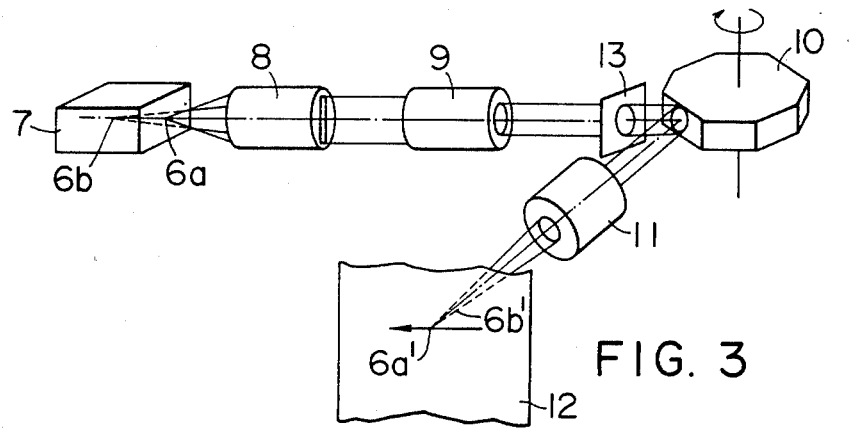
FIG. 3 is a view of optical arrangement showing an embodiment of application of the optical system of the present invention in a scanning system.

FIG. 3 shows the arrangement of the optical system of the present invention when applied in a scanning system, wherein a laser beam divergent from said position $6a$ in a plane perpendicular to the junction plane of a laser 7 and divergent from said position $6b$ in a plane parallel to said junction plane is received by an objective lens 8 and converted into a parallel beam by a cylindrical lens system 9 which has a refractive power in the direction parallel to said junction plane of the laser 7 but not in the direction perpendicular to said junction plane, and functions to enlarge the diameter of the beam in the direction parallel to said junction plane.

The focal point of said objective lens 8 is located at the beam divergent position in the direction perpendicular to said junction plane, while the focal point of said objective lens 8 and the cylindrical lens system 9 in the plane parallel to the junction plane of the laser 7 is located within the diffraction limit from the beam divergent position in said parallel plane.

Figure 4A:
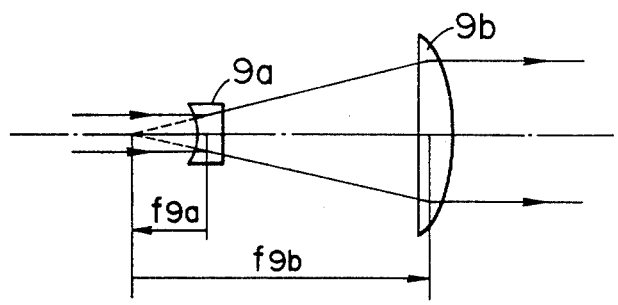
FIGS. 4A and 4B are views showing the details of the cylindrical optical system in FIG. 3.

More detailedly, said cylindrical lens system 9 is composed, as shown in FIG. 4A in the plane parallel to the junction plane of the laser 7, of a plano-concave cylindrical lens $9a$ located at the beam entrance side and having concave and planar surfaces respectively at the beam entrance and exit sides, and a plano-convex cylindrical lens $9b$ located at the beam exit side and having planar and convex surfaces respectively at the beam entrance and exit sides, wherein said lenses having a coinciding focal point to constitute an afocal system for emitting a parallel beam from said plano-convex cylindrical lens $9b$ upon receipt of a parallel beam by said plano-concave cylindrical lens $9a$.

Figure 4B:
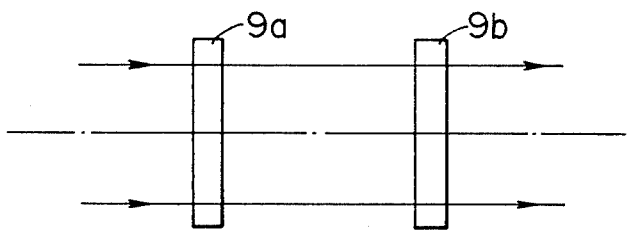

In the plane perpendicular to the junction plane of the laser 7, said cylindrical lens system 9 has no refractive power as shown in FIG. 4B whereby the entering beam is transmitted without change.

Figure 9:
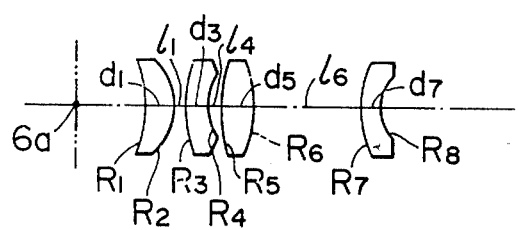
FIG. 9 is a cross-sectional view of the objective lens shown in FIG. 3.

The light beam emergent from said cylindrical lens system 9 in FIG. 3 is deflected by a deflecting mirror 10 and focused by a scanning lens 11 onto a photosensitive medium 12, which is located in the vicinity of the focal plane of said scanning lens 11. For a given astigmatic distance between the beam divergent positions in the aforementioned mutually perpendicular direction as shown in FIG. 2, the focal point $6a'$ of the beam divergent in the plane perpendicular to the junction plane of the laser 7 and focused through the entire optical system consisting of the objective lens 8, cylindrical lens system 9 and scanning lens 11 is different from the focal point $6b'$ of the beam divergent in the plane parallel to said junction plane. In such case it is empirically confirmed that a satisfactory imaging performance of the order of diffraction limit can be obtained by placing the photosensitive medium in an appropriate position between said two focal points if the following equation is satisfied:

$$\Delta S' \leq 2.44\lambda \left\{ \left(\frac{1}{DS}\right)^2 + \left(\frac{1}{DJ}\right)^2 \right\} f_{11}^2 \quad (1)$$

wherein $\Delta S'$ is the distance between said two focal points, DJ is the diameter of beam-limiting aperture 13 in FIG. 3 in the direction parallel to the junction plane of the laser, DS is the diameter of said aperture in the direction perpendicular to said junction plane, $f_{11}$ is the local length of the scanning lens 11, and $\lambda$ is the emitted wavelength of said laser. Also in order to obtain the imaging performance of the order of diffraction limit the permissible distance $\Delta S$ between the beam divergent positions in the mutually perpendicular directions is given by the following equation:

$$\Delta S \leq \left(\frac{f_{9b}}{f_{9a}}\right)^2 \cdot \left(\frac{f_8}{f_{11}}\right)^2 \cdot \Delta S' \quad (2)$$

wherein $f_{9a}$, $f_{9b}$ and $f_8$ are respectively the focal lengths of the plano-concave cylindrical lens $9a$, of the plano-convex cylindrical lens $9b$ shown in FIG. 4a and of the objective lens 8 shown in FIG. 9. Thus, from the conditions (1) and (2) there can be obtained:

$$\left|\frac{f_{9b}}{f_{9a}}\right| \geq \frac{DS \cdot DJ}{f_8} \sqrt{\frac{\Delta S}{2.44\lambda(DS^2 + DJ^2)}} \quad (3)$$

Consequently, when the ratio of focal lengths of two lenses constituting the afocal cylindrical lens system 9 satisfies the condition (3) in a scanning optical system as shown in FIG. 3, it is rendered possible to obtain a satisfactory imaging performance of the order of diffraction limit by placing the photosensitive medium at an appropriate position.

On the other hand the amount of light $E'$ to be transmitted to the photosensitive medium by the optical system of the present invention is required to satisfy the following condition:

$$E' \geq \gamma_o \cdot E_o, \text{ wherein } \gamma_o = \epsilon/E_o \quad (4)$$

wherein $\epsilon$ is the minimum amount of light required on the photosensitive medium, and $E_o$ is the total amount of light emitted by the semi-conductor laser toward the photosensitive medium.

The angular distribution of the light flux emitted by the semi-conductor laser can be substantially approximated by a Gaussian distribution. The dispersion of said distribution is represented by $\sigma_S^2$ or $\sigma_J^2$ respectively in the plane perpendicular or parallel to the junction plane of the laser, and it is assumed that the light flux emitted by the laser is received by the optical system in the angular range of $-\theta S \sim \theta S$ or $-\theta J \sim \theta J$ in said respective planes. In this case the ratios $\gamma S$ and $\gamma J$ of the light received in the respective planes are represented by the following equations:

$$\gamma S = \frac{1}{\sqrt{2\pi}\sigma_S} \int_{-\theta_S}^{\theta_S} e^{-\frac{\theta^2}{2\sigma S^2}} \cdot d\theta \quad (5)$$

-continued $$\gamma J = \frac{1}{\sqrt{2\pi\sigma_J}} \int_{-\theta J}^{\theta J} e^{-\frac{\theta^2}{2\sigma_J^2}} \cdot d\theta \quad (6)$$

By assuming that:
$$\gamma = \gamma_S \cdot \gamma_J \quad (7)$$

γ represents the ratio of the amount of light received by the optical system to the total amount of light emitted from the laser into the space. By using this γ, it is possible to secure the necessary amount of light on the photosensitive medium if the following condition is satisfied:

$$\gamma > \gamma_o \quad (8)$$

Figure 5:
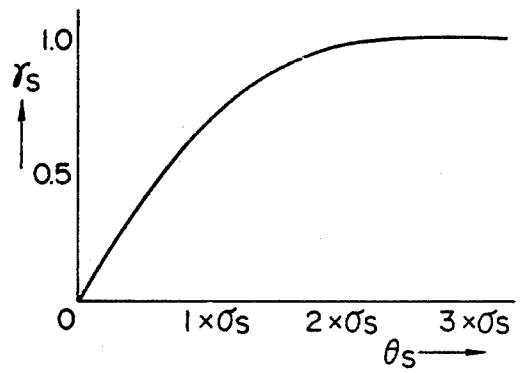
FIGS. 5 and 6 are charts showing the amount of light received by the optical system from the semi-conductor laser as a function of incident angle.
Figure 6:
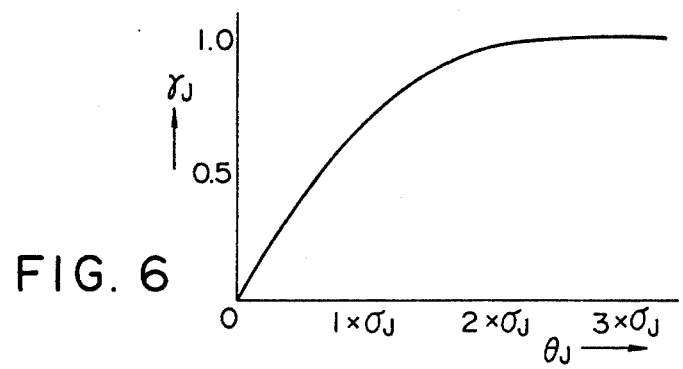

The equations (5) and (6) are graphically represented respectively in FIG. 5 and FIG. 6, wherein the ordinate indicates θS/θS or θJ/θJ, and the abscissa γS or γJ.

On the basis of these curves it is possible to determine γS and γJ from the dispersions of Gaussian distribution $\sigma_S^2$ and $\sigma_J^2$ and the light-receiving angles θS and θJ and thus to determine the value of γ from the condition (7). In the designing of the optical system, the light-receiving angles θS in the plane perpendicular to the junction plane of the laser can be determined from the equation $\theta S = \sin^{-1}(Ds/2f_8)$ for a given diameter DS of the aperture 13 in said perpendicular plane and a given focal length $f_8$ of the objective lens 8, and S can then be determined from FIG. 5. Successively the value of θJ satisfying the relation $\gamma J = \gamma_o/\gamma S$, which is taken as $\theta_{Jo}$, is determined from FIG. 6. In order that the amount of light γ actually received by the optical system becomes larger than $\gamma_o$, the light-receiving angle in the plane parallel to the junction plane of the laser should satisfy:

$$\theta J > \theta J_o \quad (9)$$

As the diameter $D_J$ of the aperture 13 in said plane is given by the following equation:

$$DJ = 2 \cdot \left| \frac{f_{9b}}{f_{9a}} \right| \cdot f_8 \sin \theta J \quad (10)$$

there can be obtained from (9) and (10):

$$\left| \frac{f_{9b}}{f_{9a}} \right| < \frac{DJ}{2f_8 \sin \theta J_o} \quad (11)$$

On the basis of the above-mentioned conditions (3) and (11) it is rendered possible to obtain a satisfactory imaging performance of the order of diffraction limit and at the same time to secure the amount of light required for recording on the photosensitive medium if the ratio of focal lengths of the lenses constituting the cylindrical lens system 9 is selected within a range defined as follows:

$$\frac{DS \cdot DJ}{f_8} \sqrt{\frac{\Delta S}{2.44\lambda(DS + DJ)}} \leq \left| \frac{f_{9b}}{f_{9a}} \right| < \frac{DJ}{2f_8 \sin \theta J_o} \quad (12)$$

In said cylindrical lens system 9 the planar surface of the plano-concave cylindrical lens is not positioned at the beam entrance side in order to prevent the inverse admission of the light reflected by said surface into the laser, as such inverse admission results in a self-coupling phenomenon, thus leading to an undersirable deviation of the emission characteristic of the laser.

Now referring to FIG. 3, the parallel property of the beam emergent from the cylindrical lens system structured as shown therein can be improved if the following condition is satisfied:

$$f_{9b}/DJ > 5 \quad (13)$$

is satisfied between the diameter DJ of the aperture in the direction parallel to the junction plane of the laser and the focal length $f_{9b}$ of the plano-convex cylindrical lens shown in FIG. 4A.

In the structure of FIG. 4A, the plano-concave cylindrical lens generates an excessively corrected spherical aberration on the entering light beam while the plano-convex cylindrical lens generates a deficiently corrected spherical aberration. The aforementioned condition (4), if satisfied, allows reduction of the spherical aberration in each lens, thus enabling satisfactory correction of the spherical aberration in the combined lens system. On the other hand if the condition (13) is not satisfied, it becomes necessary to satisfactorily correct the spherical aberration of the combined lens system because of the enhanced spherical aberration in each lens.

Figure 7:
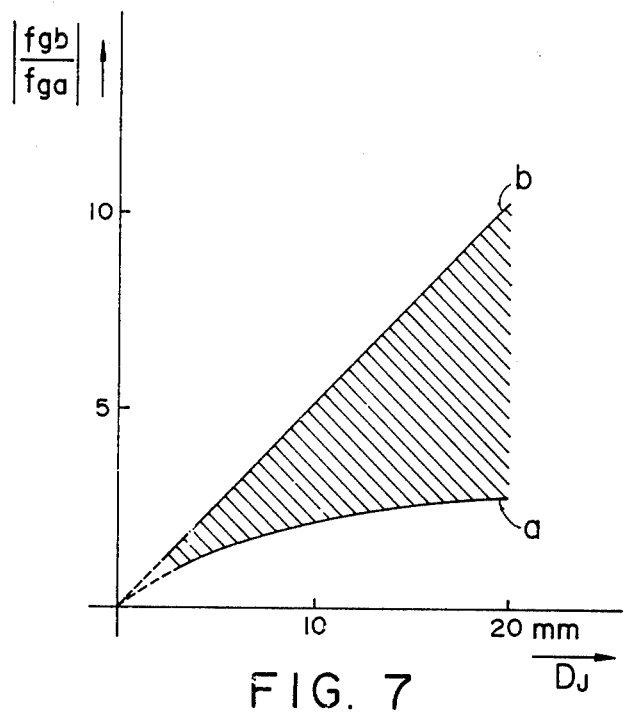
FIG. 7 is a chart showing the relation between the maximum and minimum of the absolute value of the focal length ratio of the cylindrical plano-convex and plano-concave lenses in FIG. 3.

As an example, in the optical system of the present invention with the parameters:
focal length $f_8$ of the objective lens 8: 10 mm
focal length $f_{11}$ of the scanning lens 11: 500 mm
diameter DS of the aperture in the direction perpendicular to the junction plane of the laser: 10 mm
distance ΔS of the beam divergent positions of the laser: 0.02 mm and
laser emission wavelength λ: 8000Å,
the minimum of the absolute value of the ratio of focal lengths of the plano-convex and plano-concave cylindrical lenses constituting the cylindrical lens system 9 can be represented as a function of the diameter DJ of the aperture in the direction parallel to said junction plane from the equation (3) as shown by the curve a in FIG. 7.

Also it is assumed that the angular distribution of the light emitted by the semi-conductor laser has a dispersion $\sigma_s^2 = (15°)^2$ or $\sigma_s^2 = (40°)^2$ in the direction respectively perpendicular or parallel to the junction plane of the laser, and that the minimum light ratio $\gamma_o$ required for recording on the photosensitive medium is equal to 0.8. As the light receiving angle $\theta_s$ in the plane perpendicular to the junction plane of the laser is $\theta_s = \sin^{-1}(DS/2f_8) = 30°$, the ratio $\theta_s/\sigma_s$ is equal to 2, so that $\gamma_s$ can be determined as 0.955 from FIG. 6. In order to secure the minimum amount of light on the photosensitive medium in this state, there should be satisfied from the foregoing conditions (7) and (8):

$$\gamma J > \gamma_o/\gamma S) = 0.838$$

Thus, from FIG. 6:

By putting the thus obtained figures into ne right-hand term of the condition (11) there can be determined the maximum absolute value of the ratio of focal lengths of the lenses constituting the cylindrical lens system 9 as a function of the diameter of aperture $D_J$ in the direction parallel to the junction plane of the laser, as represented by the line b in FIG. 7.

Consequently the object of the present invention can be achieved if the value of said ratio of focal lengths is located inside the hatched area shown in FIG. 7.

In the above-explained example said ratio becomes equal to unity when $D_J$ is 3.33 mm, in which case the cylindrical lens system 9 no longer performs its function and can therefore be dispensed with. In more general terms the cylindrical lens system 9 may be dispensed with when:

$$DJ \cong \sqrt{\frac{k}{1-k}} \cdot DS \qquad (14)$$

wherein:

$$k \equiv \left(\frac{f_8}{DS}\right)^2 \cdot \frac{2.44\lambda}{\Delta S}$$

Thus it is possible to obtain a relatively satisfactory imaging performance even without the cylindrical lens system 9 if the diameter $D_J$ of the aperture in the direction parallel to the junction plane of the laser is selected approximately equal to the value of the right-hand term of the condition (14).

For a value of DJ smaller than 3.33, said ratio becomes smaller than unity but such case will be excluded from consideration since it is not easily realizable with the structure shown in FIG. 4A.

Such recording optical system as explained in the foregoing allows fuel utilization of the advantage of the semi-conductor laser directly modulatable in the high-frequency range, when it is applied in a scanning apparatus. It is therefore rendered possible to achieve high-speed recording for example in case of scanning a photosensitive medium by a beam of the semi-conductor laser deflected by a rotating polygonal mirror rotated at a constant angular velocity. In such case it is possible to obtain a constant scanning speed on the photosensitive medium and thus to simplify the required electric circuit by adopting simple integer ratio between the modulating signal frequency supplied to the semi-conductor laser and the basic clock frequency if said scanning lens 11 is composed of an f-$\theta$ lens satisfying a relation $y' = f_{11}\theta$, wherein $y'$ is the distance from the optical axis to the scanned position, $\theta$ is the focal length of said lens and $\theta$ is the angle of the deflected beam entering said lens to the optical axis thereof.

Figure 19:
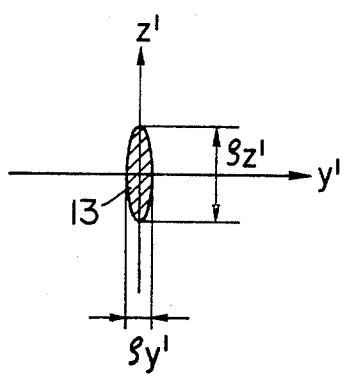
FIG. 19 is a view showing the state of a beam spot.
Figure 20:
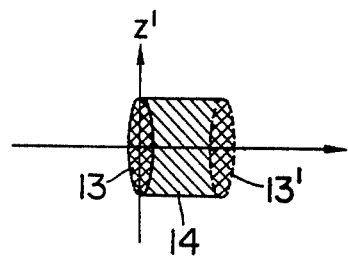
FIG. 20 is a view showing the state of displacement of the beam spot.
Figure 21A:
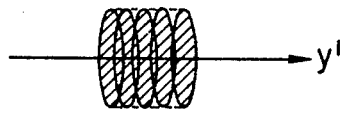
FIGS. 21A and 21B are views showing the method of overlapped recording of beam spots.
Figure 21B:

Also in case the deflecting means is composed of a galvano mirror performing a sinusoidal oscillation with an amplitude $\phi_o$ in place of the above-mentioned polygonal mirror with a constant angular velocity, a same effect as explained above can be obtained by replacing said f-$\theta$ lens with an arcsine lens satisfying the relation $y' = 2\phi_o f x \sin^{-1}(\theta/2\phi_o)$ wherein $y'$ and $\theta$ represent the same meanings as explained above. In such scanning the shape of the spot formed on the photosensitive medium can be suitably changed by appropriately selecting the diameters DS, DJ of said aperture 13. For example in case of a scanning in the $y'$-direction with a spot 13 as shown in FIG. 19, if the spot diameter $\rho_y'$ is rendered smaller than the spot diameter $\rho_z'$ in the perpendicular $z'$-direction, the spot displacement from the position 13 to 13' as shown in FIG. 20 within a modulation time of a picture element provides an enlarged spot as represented by 14, whereby the dimension of said recorded spot of a picture element in the $y'$-direction can be made same as that in the $z'$-direction.

Also it is possible to modulate the semi-conductor laser with a higher frequency to cause overlapping of plural picture elements in the scanning direction, thereby obtaining an image showing an elevated contrast in the scanning direction or the perpendicular direction thereto.

As explained in the foregoing various controls on the image quality are rendered possible by appropriate selection of the aperture diameters in the scanning system.

In such case, however, satisfactory image quality can be obtained only when the ratio of focal lengths $|f_{9b}/f_{9a}|$ of the lenses constituting the cylindrical lens system satisfies the condition (12). In the foregoing numerical example a satisfactory image as explained above can be obtained by selecting a combination of the aperture diameter DJ and the value of $|f_{9b}/f_{9a}|$ located within the hatched area shown in FIG. 7.

Figure 8:
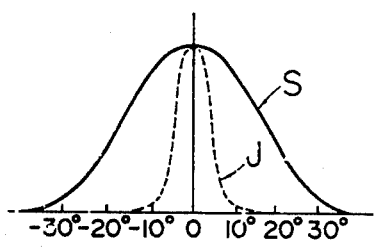
FIG. 8 is a chart showing the light distribution characteristic of the semi-conductor laser.

In the following there will be shown an example of the present invention. FIG. 8 shows the angular emission distribution of the semi-conductor laser employed in the present invention wherein the curves S and J represent the light intensity in the ordinate respectively in the direction perpendicular and parallel to the junction plane of the laser as a function of divergent angle in the abscissa. Said distribution in said perpendicular or parallel direction can be sufficiently approximated by a Gaussian distribution with a dispersion $\sigma_s^2$ or $\sigma_j^2$ approximately corresponding to $(15°)^2$ or $(4°)^2$. Said laser functions in single mode with an emission wavelength approximately equal to 8000 Å and is provided with a distance of ca. 0.02 mm between the beam divergent positions.

Figure 10:
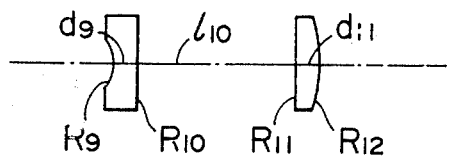
FIG. 10 is a cross-sectional view of the cylindrical lens system shown in FIG. 3.
Figure 11:
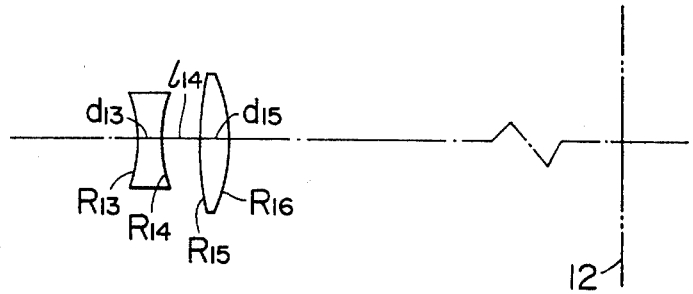
FIG. 11 is a cross-sectional view of the scanning lens shown in FIG. 3.

FIGS. 9, 10 and 11 are cross-sectional view respectively of the objective lens 8, cylindrical lens system 9 and scanning lens 11, of which parameters are summarized in Tab. 1, wherein Ri being the curvature of the i-th surface, di the lens thickness along the optical axis, li the air gap and Ni the refractive index of the lens.

Figure 12:
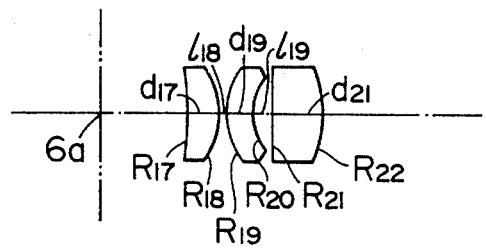
FIG. 12 is a cross-sectional view of a modification of the lens shown in FIG. 9.

The objective lens shown in Tab. 1 is provided with a negatively refractive concave lens at the beam exit side to form a so-called retrofocus structure which is for lengthening the working distance between the light emitting surface of the laser and the objective lens and is effective for obtaining a relatively long working distance particularly in case of an objective lens of a short focal length. However, in case said focal length is sufficiently long, said concave lens may be dispensed with as shown in FIG. 12, of which parameters are summarized in Tab. 2.

Figure 13:
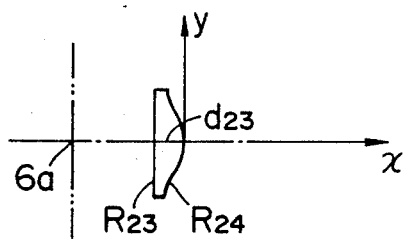
FIG. 13 is a cross-sectional view of a modification of the objective lens.
Figure 14:
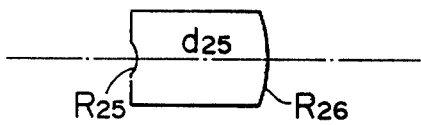
FIG. 14 is a cross-sectional view of a modification of the cylindrical lens.

Furthermore said objective lens may be composed of a single aspherical lens as shown in FIG. 13, of which parameters are summarized in Tab. 3, wherein the aspherical form can be represented by the following equation:

$$x = \frac{\frac{y^2}{R_{24}}}{\sqrt{1-(y/R_{24})^2}} + Ay^4 + By^6$$

wherein $R_{24} = -7.833$
$A = 1.44747 \times 10^{-4}$
$B = 3.52553 \times 10^{-6}$ Also the cylindrical lens system shown in FIG. 10 can be equivalently replaced by a single lens as shown in FIG. 14, of which parameters are summarized in Tab. 4. In this case $f_{9a}$ and $f_{9b}$ are respectively equal to the focal lengths of the faces 25 and 26. Any arbitrary combination of the above-explained various objective lenses and cylindrical lens systems can be employed in the present invention.

However, particularly preferred is the combination of the single aspherical objective lens shown in FIG. 13 and the single cylindrical lens shown in FIG. 14, since such combination realizes a simple structure, allowing to achieve a simpler adjustment and a lower production cost. Also a lesser number of constituting surfaces is advantageous in increasing the light transmission and thus the amount of light transmitted to the photosensitive medium.

The aperture employed in the present example is of a diameter of 9.3 mm for the 4-element objective lens shown in FIG. 9. A satisfactory imaging performance can be obtained also with an aperture provided with dimensions of 9.3 mm and 16.8 mm respectively in the directions perpendicular and parallel to the junction plane of the laser.

In case of using an aperture of a diameter of 9.3 mm with a minimum light amount ratio $\gamma_o$ of 0.686 required for the recording, the permissible range for the local length ratio of the cylindrical lens system can be determined as follows from the condition (12):

$$2.1 \leq |f_9b/f_9a| < 6.0$$

In the present example said ratio for the cylindrical lens shown in FIG. 10 and Tab. 1 is:

$$|f_9b/f_9a| = 4.13$$

while that for the cylindrical lens shown in FIG. 14 and Tab. 4 is:
$$|f_9b/f_9a| = 3.83$$

Also said range for an aperture with the dimensions of 9.3 and 16.8 mm respectively in the directions perpendicular and parallel to the junction plane of the laser can similarly defined from the condition (12) as follows:

$$2.6 \leq |f_9b/f_9a| < 10.8$$

which is also satisfied in the present example.

Figure 15:
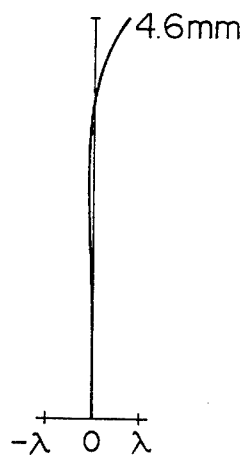
FIG. 15 is a chart showing the collimating ability of the objective lens shown in FIG. 9.

FIG. 15 shows the collimating performance of the objective lens shown in FIG. 9 and Tab. 1.

Figure 16:
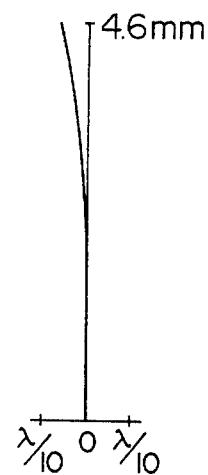
FIG. 16 is a chart showing the characteristic of the parallel beam emergent from the cylindrical lens shown in FIG. 10.

FIG. 16 shows the parallel property of the emergent beam from the cylindrical lens shown in FIG. 10 and Tab. 1.

Figure 17A:
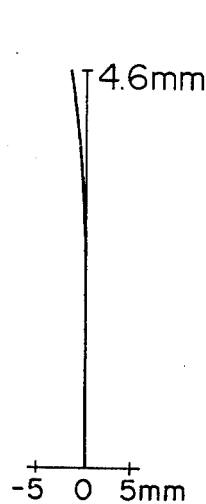
FIGS. 17A and 17B is a chart showing the characteristic of the scanning lens shown in FIG. 11.
Figure 17B:
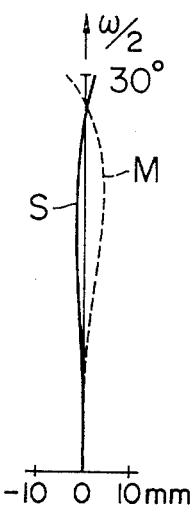

FIGS. 17A and 17B show the performance of the scanning lens shown in FIG. 11 and Tab. 1, wherein A representing the spherical aberration while B representing astigmatism and image plane curvature.

Figure 18:
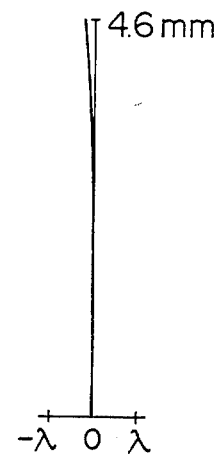
FIG. 18 is a chart showing the characteristic of the objective lens shown in FIG. 12.

FIG. 18 shows the performance of the objective lens shown in FIG. 12 and Tab. 2.

In the foregoing FIGS. 15, 16 and 18 the abscissa represents the wavelength aberration with $1\lambda = 0.8 \times 10^{-3}$ mm while the ordinate represents the height of the emergent beam. Also the ordinate of FIG. 17B represents the angle of the deflected beam entering the scanning lens to the optical axis thereof, wherein M and S respectively representing the image plane curvature in the meridional and sagittal cross sections.

The performances of the objective lens shown in FIG. 13 and of the cylindrical lens shown in FIG. 14 are omitted as they are approximately similar to those of the objective lens shown in FIG. 9 and the cylindrical lens shown in FIG. 10. As shown in these graphs, these lenses are provided with satisfactory performances of the order of diffraction limit.

TABLE 1

| | No. | Ri | di | li | Ni | |
|---|---|---|---|---|---|---|
| Objective lens | 1 | −73.011 | 4.46 | | 1.79154 | |
| | 2 | −12.905 | | 1.94 | | |
| | 3 | 36.505 | 5.37 | | 1.50993 | $f_8 = 10$ |
| | 4 | 16.316 | | 3.75 | | N.A = 0.47 |
| | 5 | 34.884 | 8.42 | | 1.79154 | |
| | 6 | −60.154 | | 54.40 | | |
| | 7 | 174.442 | 4.21 | | 1.50993 | |
| | 8 | 31.684 | | | | |
| | 9 | −8.491 | 10.53 | | 1.50993 | |
| Cylindrical lens | 10 | ∞ | | 39.28 | | |
| | 11 | ∞ | 10.53 | | 1.78331 | $\left|\dfrac{f_9b}{f_9a}\right| = 4.13$ |
| | 12 | −53.895 | | | | |
| Scanning lens | 13 | −178.800 | 12.42 | | 1.50993 | |
| | 14 | 574.084 | | 30.13 | | $f_{11} = 463$ |
| | 15 | 2174.316 | 15.07 | | 1.78331 | F/50 |
| | 16 | −165.579 | | | | $\omega/2 = 30°$ |

TABLE 2

| No. | Ri | di | li | Ni | |
|---|---|---|---|---|---|
| 17 | 489.200 | 10.13 | | 1.79154 | |
| 18 | −16.316 | | 1.35 | | |
| 19 | 32.669 | 4.44 | | 1.50993 | $f_8 = 17.9$ |
| 20 | 17.208 | | 1.18 | | N.A. = 0.26 |
| 21 | 43.789 | 15.01 | | 1.79154 | |
| 22 | −154.316 | | | | |

TABLE 3

| No. | Ri | di | Ni | |
|---|---|---|---|---|
| 23 | ∞ | 5.32 | 1.78331 | $f_8 = 10$ |
| 24 | −7.833 (aspheric) | | | N.A = 0.47 |

TABLE 4

| No. | Ri | di | Ni | |
|---|---|---|---|---|
| 25 | −8.491 | | | |
| 26 | −32.549 | 72.86 | 1.49300 | $\left|\dfrac{f_9b}{f_9a}\right| = 3.83$ |

Now there will be explained in the following an electrophotographic laser beam recording apparatus in which the optical system of the present invention is applied. Said apparatus may be constructed in a similar manner as the apparatus shown in FIG. 3, wherein the modulating signals are supplied to the semi-conductor laser 7 to control the light emission thereof, and an electrophotographic photosensitive member or photosensitive drum is placed on the scanned surface 12. Said electrophotographic photosensitive member is preferably composed of CdS, since the near-infrared emission of the semi-conductor laser matches the spectral sensitivity of such CdS photosensitive member. More specifically the electrophotographic photosensitive member can be composed for example of zinc oxide, amorphous selenium or cadmium sulfide. However the selenium-based photosensitive member does not match the near-infrared light as the high-sensitivity spectral region is located at the short-wavelength side. Selenium doped with arsenium or telurium is known to have a spectral sensitivity displace toward the longer wavelength side and can therefore be employed in the present invention. In such case, however, the addition of As or Te may result in undesirable phenomenon such as a lowered dark resistance, so that the photosensitive layer may require an appropriate counter-measure such a two-layered photosensitive layer structure. The zinc oxide-based photosensitive layer can be spectrally sensitized to match the emission of the semi-conductor laser though the original spectral sensitivity lies in the region of 350–400 mμ. However, the absolute sensitivity of such photosensitive layer is less than 1/10 of the CdS-based photosensitive layer. For this reason preferred is a CdS-based photosensitive member, which is most preferably of a three-layered structure consisting of a conductive substrate, a CdS photoconductive layer and an insulating layer.

What we claim is:

1. A recording optical system, comprising:
    a semi-conductor laser;
    an objective optical system having a focal point located approximately coincident with the beam divergent position in the plane perpendicular to the junction plane of said semi-conductor laser;
    a photosensitive medium for receiving information to be recorded;
    an imaging optical system provided between said objective optical system and said photosensitive medium; and
    an afocal anamorphic optical system provided between said objective optical system and said imaging optical system and having a refractive power only in the plane parallel to the junction plane of said semi-conductor laser, said afocal optical system including means for positioning the image point of the beam divergent position in the plane parallel to the junction plane of the semi-conductor laser in the vicinity of said photosensitive medium and distanced within the diffraction limit from the image point of the beam divergent position in the plane perpendicular to the junction plane.

2. A recording optical system according to claim 1, wherein said afocal optical system includes a beam divergent element having a focal length $f_{9a}$ and a beam convergent element having a focal length $f_{9b}$, said elements being arranged in the named order from the semi-conductor laser, and wherein the following relationships are satisfied:

$$\frac{DS \cdot DJ}{f_8} \sqrt{\frac{\Delta S}{2.44\lambda(DS + DJ)}} \leq \left| \frac{f_{9b}}{f_{9a}} \right| < \frac{DJ}{2f_8 \sin\theta J_o}$$

where:
    $\Delta S$ is the distance between the beam divergent positions in perpendicular directions;
    $f_8$ is the focal length of the objective optical system;
    $\lambda$ is the wave length of the laser beam;
    DS is the diameter of the beam incident on the imaging optical system in the direction perpendicular to the junction plane of the semi-conductor laser;
    DJ is the diameter of the beam incident on the imaging optical system in the direction parallel to the junction plane of the semi-conductor laser; and
    $\theta J_o$ is the light-receiving angle of a component of the beam parallel to the junction plane of the semi-conductor laser which is necessary to provide a required amount of light for the photosensitive medium.

3. A recording optical system according to claim 2, wherein said objective optical system is a three-element spherical lens system including at least one negatively refracting element.

4. A recording optical system according to claim 2, wherein said objective optical system is a four-element spherical lens system having at least two negative refracting elements of which one is located at the photosensitive medium side.

5. A recording optical system according to claim 2, wherein said objective optical system is composed of a single aspherical lens.

6. A recording optical system according to claim 2, wherein $$f_{9b}/DJ > 5.$$

7. A recording optical system according to claim 2, wherein said anamorphic optical system consists of two cylindrical lenses, said beam divergent element including a plano-concave cylindrical lens having a concave surface facing said objective optical system, and said beam convergent element including a plano-convex cylindrical lens having a convex surface facing said imaging optical system.

8. A recording optical system according to claim 2, wherein said anamorphic optical system consists of a single cylindrical lens, said cylindrical lens having a concave surface which faces said objective optical system and functions as said beam divergent element, and also having a convex surface which faces said imaging optical system and functions as said beam convergent element.

9. A recording optical system, comprising:
    a semi-conductor laser of substantially single mode;
    a deflector for deflecting the beam from said semi-conductor laser along a predetermined direction;
    a photosensitive medium to be scanned by the deflected beam;
    an objective lens system positioned between said deflector and said semi-conductor laser such that a focal plane thereof is provided to coincide with the beam divergent position in the plane perpendicular to the junction plane of the laser;
    an image optical system provided between said deflector and said photosensitive medium and having a focal plane located in the vicinity of said photosensitive medium; and
    an afocal cylindrical optical system provided between said objective lens system and said deflector and having a refractive power only in the plane parallel to the junction plane of said laser, said afocal cylindrical optical system having means for positioning the image point of the beam divergent position in the plane parallel to the junction plane of the semi-conductor laser in the vicinity of said photosensitive medium and distanced within the diffraction limit from the image point of the beam divergent position in the plane perpendicular to the junction plane.

10. A recording optical system according to claim 9, further comprising a diaphragm for limiting the light beam between said afocal cylindrical optical system and said deflector, said diaphragm having a diameter DJ in the direction parallel to the junction plane of said semi-conductor laser and a diameter DS in the direction perpendicular to the junction plane of said semi-conductor laser, wherein said afocal cylindrical optical system includes a negative cylindrical lens having a focal length $f_{9a}$ and a positive cylindrical lens having a focal length $f_{9b}$, and wherein the following relationships are satisfied:

$$\frac{DS \cdot DJ}{f_8} \sqrt{\frac{\Delta S}{2.44\lambda(DS + DJ)}} \leq \left|\frac{f_{9b}}{f_{9a}}\right| < \frac{DJ}{2f_8 \sin\theta J_o}$$

where:

$\Delta S$ is the distance between the beam divergent positions in perpendicular directions;

$f_8$ is the focal length of the objective optical system;

$\lambda$ is the wave length of the laser beam; and $\theta J_o$ is the light-receiving angle of a component of the beam parallel to the junction plane of the semi-conductor laser which is necessary to provide a required amount of light for the photosensitive medium.

* * * * *